United States Patent
Bähner et al.

(10) Patent No.: US 7,894,974 B2
(45) Date of Patent: Feb. 22, 2011

(54) METHOD FOR OPERATING A TWO-STROKE ENGINE

(75) Inventors: Andreas Bähner, Weinstadt (DE); Andreas Lingen, Althütte (DE); Georg Maier, Kernen i. R. (DE); Heinrich Leufen, Schwaikheim (DE); Stanislaw Cichon, Fürth (DE); Leo Kießling, Cadolzburg (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 190 days.

(21) Appl. No.: 12/165,737

(22) Filed: Jul. 1, 2008

(65) Prior Publication Data
US 2009/0012699 A1 Jan. 8, 2009

(30) Foreign Application Priority Data
Jul. 5, 2007 (DE) .................. 10 2007 031 396

(51) Int. Cl.
*F02D 45/00* (2006.01)
(52) U.S. Cl. ................................. 701/105; 123/406.11
(58) Field of Classification Search ......... 701/101–105, 701/110, 112–114; 123/179.5, 339.11, 406.11, 123/406.12, 406.23, 406.24, 406.32, 406.35, 123/406.5, 406.54
See application file for complete search history.

(56) References Cited

U.S. PATENT DOCUMENTS

| | | | | |
|---|---|---|---|---|
| 4,338,899 A * | 7/1982 | Geiger et al. | ........... | 123/339.11 |
| 5,579,736 A * | 12/1996 | Nakamura et al. | ..... | 123/339.11 |
| 6,116,213 A * | 9/2000 | Yasui et al. | ............ | 123/339.11 |
| 6,223,723 B1 * | 5/2001 | Ito | ......................... | 123/406.51 |
| 7,556,020 B2 * | 7/2009 | Kolossow | .............. | 123/406.54 |
| 2003/0098010 A1 * | 5/2003 | Kustosch | ............... | 123/339.11 |
| 2005/0188953 A1 * | 9/2005 | Ishikawa et al. | ....... | 123/339.11 |

FOREIGN PATENT DOCUMENTS

DE 3817471 C1 11/1989

\* cited by examiner

*Primary Examiner*—Stephen K Cronin
*Assistant Examiner*—Johnny H Hoang
(74) *Attorney, Agent, or Firm*—Gudrun E. Huckett

(57) ABSTRACT

A two-stroke engine has a cylinder with a combustion chamber delimited by a reciprocating piston, wherein the piston drives in rotation a crankshaft, and wherein a spark plug projects into the combustion chamber and ignites a fuel/air mixture. The two-stroke engine further has devices for supplying fuel and combustion air to the combustion chamber and a control unit that determines the ignition timing based on an ignition map. The ignition map indicates the ignition timing as a function of the engine speed for at least one first and one second operating states and for at least one first and one second engine speed ranges. The engine is controlled in that for an engine cycle the ignition timing is set in the second operating state at least within the first engine speed range based on the engine speed and on the number of engine cycles since the last combustion.

19 Claims, 3 Drawing Sheets

METHOD FOR OPERATING A TWO-STROKE ENGINE

BACKGROUND OF THE INVENTION

The invention relates to a method for operating a two-stroke engine that comprises a cylinder provided with a combustion chamber that is delimited by a reciprocatingly supported piston. The piston drives in rotation a crankshaft. A spark plug projects into the combustion chamber and ignites a fuel/air mixture in the combustion chamber. Devices for supplying fuel and combustion air into the combustion chamber are provided. A control unit determines ignition time by means of an ignition map wherein the ignition map indicates the ignition timing as a function of the engine speed for at least a first and a second operating states and for at least a first and a second engine speed ranges.

DE 38 17 471 C1 discloses a method for operating a two-stroke engine in which the ignition timing is set by means of an ignition map. At low engine speeds the ignition map has two characteristic lines, i.e., a characteristic line for the starting operation and a further characteristic line for normal (regular) operation of the two-stroke engine. When starting the engine, with increasing engine speed the ignition timing is advanced. In operation at low engine speeds the ignition timing is advanced when the engine speed decreases.

With this characteristic line control of the ignition timing, a very simple control for the ignition timing can be realized. However, it has been found that with this very simple control of the ignition timing the engine may stall in operation, in particular at low engine speed.

SUMMARY OF THE INVENTION

It is an object of the present invention to provide a method for operating a two-stroke engine with which a stable running of the engine can be achieved in a simple way.

In accordance with the present invention, this is achieved by a first method in that, in the second operating state, the ignition timing for an engine cycle is set, at least in the first engine speed range, based on the engine speed and based on the number of engine cycles that have elapsed since the last combustion.

In accordance with the present invention this is achieved by a second method in that the ignition map in the second engine speed range provides different ignition timings for the first and the second operating states at same engine speeds, wherein the second engine speed range is delimited by an upper engine speed limit, wherein in the first operating state the ignition timing is advanced when the engine speed drops from upper engine speed limit of the engine speed range and in the second operating state the ignition timing is retarded when the engine speed drops from the upper engine speed limit of the engine speed range, and wherein in the first operating state the ignition timing in the second engine speed range is set as a function of an engine speed such that the ignition timing is not before an earliest ignition timing for this engine speed, wherein the earliest ignition timing is retarded when the engine speed drops.

It has been found that stalling of a two-stroke engine can be caused by the ignition timing at low engine speeds being advanced to such early ignition that kickback occurs, i.e. that the piston before reaching the top dead center is accelerated again toward bottom dead center, i.e., the crankshaft is driven in opposite direction. This causes immediate stalling of the combustion engine. It has been found that a kickback not only depends on the ignition timing and the engine speed but also on how strong the combustion is within the combustion chamber. The strength of the combustion in the combustion chamber depends on how tell the combustion chamber has been scavenged. It has been found that the measure for how well the combustion chamber has been scavenged is the number of engine cycles since the last combustion. When the combustion chamber has been scavenged for several engine cycles, i.e. for several engine cycles no combustion has taken place, an excellent combustion chamber scavenging is provided. A very strong combustion is to be expected and the kickback probability is relatively high. When the last combustion happened during the last engine cycle or only a few engine cycles back, the combustion chamber has not yet been well scavenged so that the combustion cannot be that strong. The kickback probability is lower in this case.

For determining the ignition timing it is the therefore provided to take into consideration an engine speed as well as the number of engine cycles since the last combustion. In this way, the ignition timing can be selected optimally for an engine cycle such that the ignition timing is as advanced as possible but at the same time it is ensured that no kickback occurs. Whether combustion has taken place or not can be determined in a simple way based on the engine speed course of the internal combustion engine. In this way, for performing the method no additional devices such as additional sensors of the like are required.

Advantageously, the ignition timing for each engine cycle is set within the first engine speed range based on an engine speed and based on the number of engine cycles since the last combustion. In this way, for each engine cycle an optimal ignition timing can be determined. Setting the ignition timing can be realized in a simple way in that the ignition map in the first engine speed range has several characteristic lines that define the ignition timing is a function of the engine speed. Based on the engine cycles since the last combustion advantageously a characteristic line for determining the ignition timing for the subsequent engine cycle is selected. Based on the selected characteristic line, the ignition timing is determined as a function of the engine speed.

It has been found that stalling of the two-stroke engine can be caused in that in an operating state at low engine speed, when the engine speed drops even more, a further advance of the ignition timing can cause kickback. It is provided that the ignition map in a second engine speed range for the first and the second operating states at identical engine speeds provides different ignition timings wherein the second engine speed range is delimited by an upper engine speed limit, wherein in the first operating state the ignition timing for an engine speed that decreases from the upper engine speed limit of the engine speed range is advanced and in the second operating state the ignition timing for an engine speed that decreases from the upper engine speed limit is retarded. In order to prevent kickback it is provided that in the first operating state the ignition timing in the second engine speed range is adjusted as a function of an engine speed such that the ignition timing is not advanced to a point before an earliest ignition timing for this engine speed, wherein the earliest ignition timing for decreasing engine speed is retarded.

The earliest ignition timing is described by a curve that for dropping engine speeds descends toward retarded ignition timings. The lower the engine speed of the internal combustion engine, the more retarded the ignition timing must be selected in order to prevent kickback. This is achieved in a simple way by the earliest ignition timing that represents a limit value before which the ignition timing should not be.

Setting the ignition timing in such a way that the ignition timing is not before an earliest ignition timing for the engine speed in question can be realized in a method for operating a two-stroke engine in which method in an operating state the ignition timing for an engine cycle is determined based on an engine speed and based on the number of engine cycles since the last combustion. The determination of the ignition timing taking into consideration an earliest ignition timing can however be utilized also for two-stroke engines in which the ignition timing is not determined based on the number of engine cycles since the last combustion.

It is provided that the first engine speed range overlaps at least partially the second engine speed range. In particular, the first engine speed range and the second engine speed range are identical. The first engine speed range is the engine speed range in which the ignition timing for an engine cycle is determined based on an engine speed and based on the number of engine cycles since the last combustion. The second engine speed range is the engine speed range in which the ignition map for the first and second operating states at identical engine speeds provides different ignition timings, i.e., in particular the engine speed range in which the at least two characteristic lines are present.

Advantageously, the ignition timing is determined based on a momentary engine speed. The momentary engine speed is the engine speed that exists at a predetermined point in time of an engine cycle. However, it can also be provided that the ignition timing is set based on the average engine speed of an engine cycle. The determination of the ignition timing based on an average engine speed is sufficiently precise. The average engine speed can be determined in a simple way by averaging. This does not require a fast electronic evaluation circuit as it may be required for the determination of a momentary engine speed.

Advantageously, the first engine operating state is the starting operation and the first engine speed range is delimited by a lower starting engine speed and an upper starting engine speed. The lower starting engine speed is in particular the starting engine speed below which no starting is possible. Below this engine speed a spark for ignition cannot be generated. The upper starting engine speed is the engine speed that ensures that the engine will run automatically. This is the engine speed that cannot be reached by a starting device; for example, by a pull cable, not even by an experienced operator. When the upper starting engine speed is surpassed the two-stroke engine is running. The second operating state is in particular normal operation.

It is provided that the control unit will switch from a characteristic line for the first operating state to a characteristic line for the second operating state when at least one switching condition is fulfilled. Advantageously, several switching conditions must be fulfilled in order to trigger switching. In particular, a switching condition is the lapse of a predetermined time interval. It can also be provided that one switching condition is that a predetermined number of engine cycles must have been completed. Expediently, a switching condition is that a switching engine speed is reached. The switching engine speed is in particular a set engine speed that is from 2,300 rpm to 3,500 rpm. It can be provided that one switching condition is that a predetermined number of combustions has taken place. It is provided that for determining whether a combustion has taken place the engine speed difference between two engine cycles is determined. For determining whether combustion has taken place, an engine speed increase relative to a time interval can be determined. In this connection, the engine speed increase can be based on an entire engine cycle but it can also be expedient to evaluate only a partial section of the engine cycle, in particular, a range of the engine cycle between the top and bottom dead centers of the piston.

Advantageously, completion of a predetermined number of engine cycles, in particular 15 to 30 engine cycles, surpassing a switching engine speed, and additionally the presence of a predetermined number of combustions can be utilized as a switching condition.

It is provided that the control unit switches from a characteristic line for the second operating state to a characteristic line for the first operating state when at least one return condition is fulfilled. Expediently, the return condition is the actuation of a stop switch of the two-stroke engine. In this way it is ensured that the ignition timing when starting the engine is determined always based on the characteristic line for the starting state. Advantageously, a return condition is that the engine speed undershoots the self-sustaining engine speed. When the engine speed drops below a self-sustaining engine speed, the kinetic energy of the two-stroke engine is not sufficient to prevent a kickback at early ignition timings. In this connection it is provided that switching takes place to the characteristic line for the first operating state, i.e., the ignition timing is retarded. In this way, it is ensured that the piston is accelerated and no kickback can occur.

DESCRIPTION OF THE PREFERRED EMBODIMENTS

Figure 1:
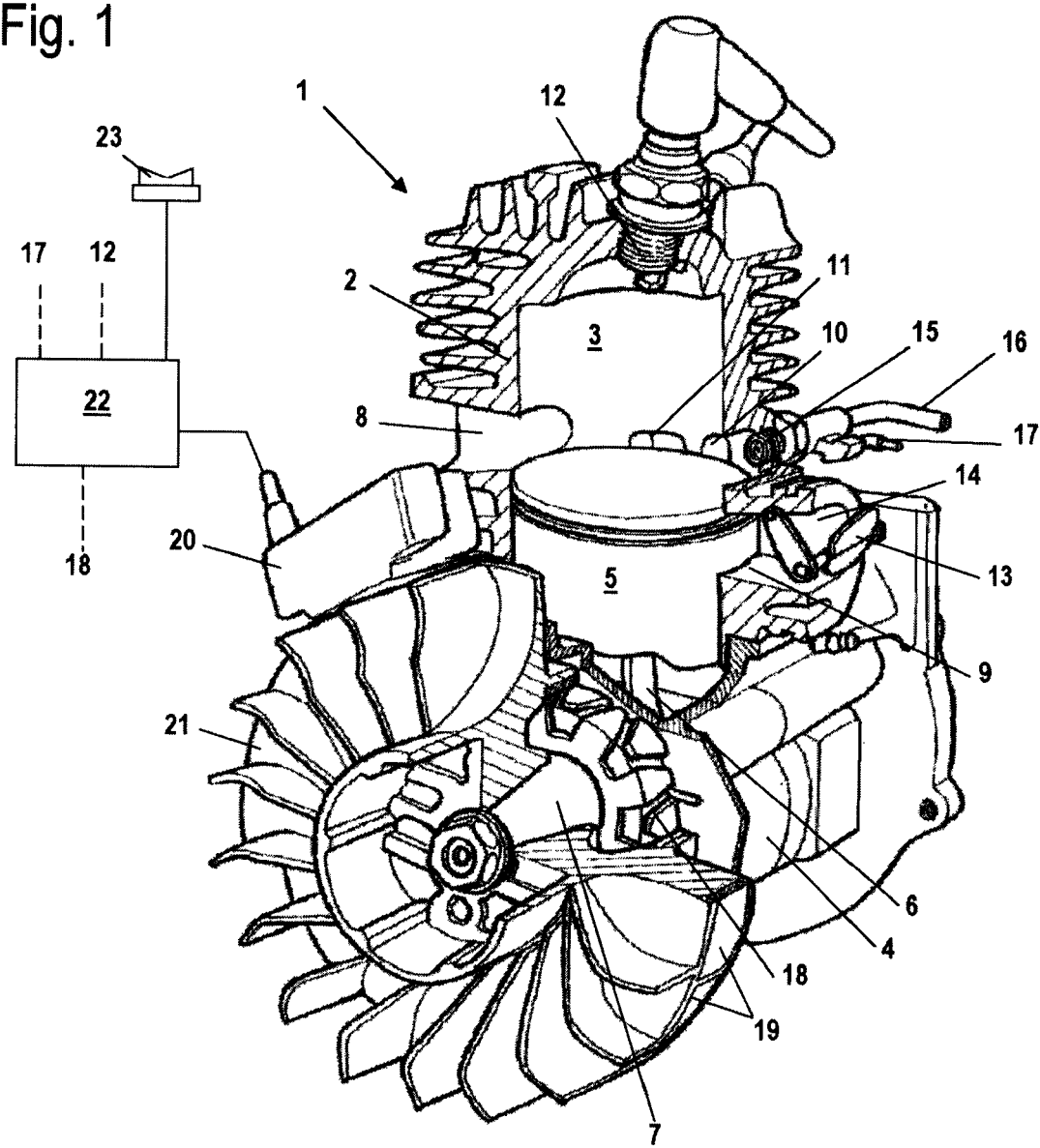
FIG. 1 is a perspective partially sectioned illustration of a two-stroke engine

The two-stroke engine 1 illustrated in FIG. 1 is in particular a drive motor for a hand-held power tool such as a motor chainsaw, a cut-off machine, a trimmer or the like. The two-stroke engine 1 comprises a cylinder 2 with an internal combustion chamber 3. The internal combustion chamber 3 is delimited by a piston 5 that, by means of a connecting rod 6, drives in rotation a crankshaft 7 that is rotatably supported in the crankcase 4. A spark plug 12 projects into the internal combustion chamber 3 and is connected to a control unit 22 of a two-stroke engine 1. An exhaust port 8 is connected to the combustion chamber 3; the exhaust gases exit from the chamber 3 through the port 8. The two-stroke engine 1 has a total of four transfer passages 10 and 11 of which two are illustrated in FIG. 1. The four transfer passages are symmetrical to a center plane dividing the exhaust port 8. Two transfer passages 11 are provided proximal to the exhaust port 8 and two transfer passages 120 are provided proximal to the intake port. The transfer passages 10 near the intake port are arranged close to the intake port 9 that is piston-controlled by piston 5 and that supplies combustion air to the crankcase 4. An intake passage 14 is connected to the intake port 9 and a throttle 13 is pivotably supported in the passage 14. The position of the throttle 13 can be changed by the operator in particular by means of the throttle lever. The transfer passages 10 and 11 connects the combustion chamber 3 to the crankcase 4 in the area of the bottom dead center of the piston 5 illustrated in FIG. 1 so that pre-compressed combustion air can flow from the crankcase 4 via the transfer passages 10 and 11 into the combustion chamber 3.

In one of the transfer passages 10 near the intake port there is a valve 15 arranged that is connected to a fuel line 16. By means of valve 15 fuel is supplied to the transfer passage 10 near the intake port. The valve 15 has a control line 17 that is also connected to the control unit 22. The fuel valve 15 is thus controlled by the control unit 22.

The section of the crankshaft 7 projecting from the crankcase 4 supports a generator 18 (alternator) that provides electrical energy. By means of the output signal of the generator or alternator 18 the engine speed of the crankshaft 7 can be determined also. The alternator 18 is also connected to the control unit 22. The alternator 18 provides a control signal, i.e. the engine speed n, as well as the energy supply for the control unit 22. Moreover, a fan wheel 21 is fixedly connected to the crankshaft 7. Pole shoes 19 are arranged on the fan wheel 21 that interact with a magnet provided on the fan wheel 21. The pole shoes 19 induce a voltage in an ignition module 20 arranged on the circumference of the fan wheel 21 and this voltage can be used for supplying the spark plug 12 with energy. It can be provided that the entire energy required for operating the two-stroke engine 1 is provided by the ignition module 20. It can also be provided that the entire energy, i.e., also the energy for the spark plug 12, is provided by the alternator 18.

In order to interrupt ignition, the two-stroke engine 1 has a stop switch 23. The stop switch 23 is also connected to the control unit 22. Advantageously, the stop switch 23 directly interrupts the energy supply to the spark plug 12. Alternatively, it can be provided that the stop switch 23 is connected only to the control unit 22 and the control unit 22 effects interruption of the energy supply.

In operations upon upward stroke of the piston 5 of the two-stroke engine 1 combustion air is taken in through the intake port 9 into the crankcase 4. During the subsequent downward stroke of the piston 5 the combustion air is compressed and the combustion air flows from the crankcase 4 into the combustion chamber 3 when the transfer passages 10 and 11 open toward the combustion chamber 3. By means of valve 15 during this transfer of combustion air fuel can be metered into the combustion air. In this connection, first substantially fuel-free combustion air can flow into the combustion chamber 3 in order to scavenge exhaust gases from the preceding engine cycle out of the combustion chamber 3. It can also be provided that fuel is supplied through the transfer passage 10 into the crankcase 4. The fuel/air mixture in the combustion chamber 3 is compressed during upward stroke of the piston 5 and in the area of the top dead center is ignited by means of the spark plug 12 at an ignition timing IT that is set by the control unit 22. The combustion of the mixture in the combustion chamber 3 accelerates the piston 5 in the direction toward the crankcase 4. The exhaust gases flow through exhaust port 8 out of the combustion chamber 3 as soon as the exhaust port 8 opens.

Figure 2:
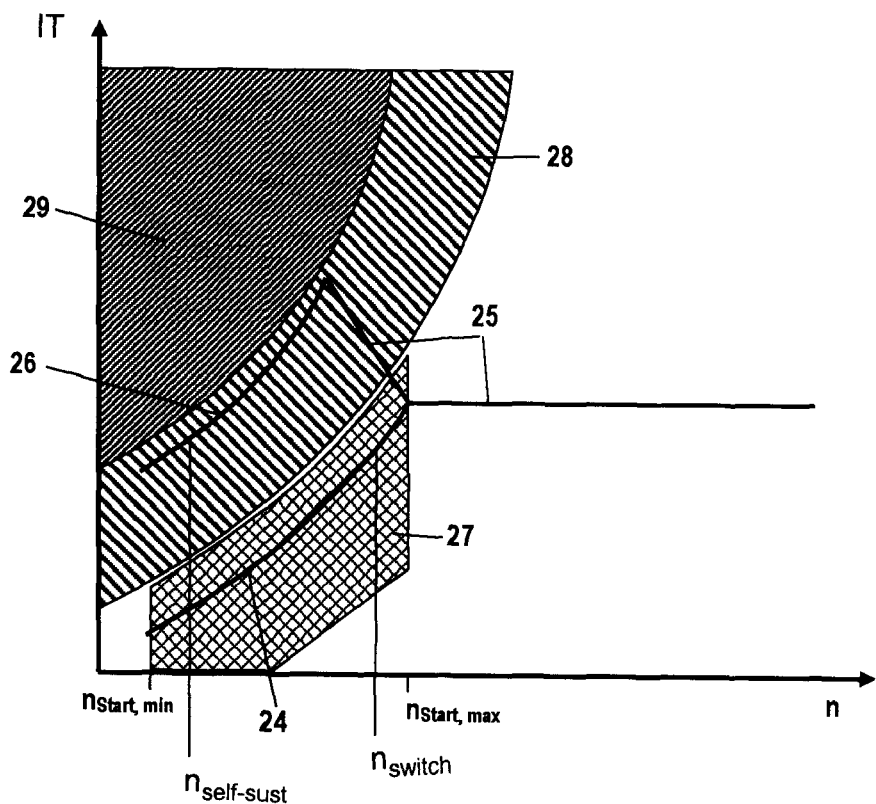
FIG. 2 shows an ignition map that provides the ignition timing as a function of engine speed.

For controlling the ignition timing IT of the two-stroke engine 1 an ignition map illustrated in FIG. 2 is provided. The ignition map provides the ignition timing IT as a function of the engine speed n of the two-stroke engine 1. The illustration is selected such that the engine speed axis approximately indicates the zero value of the ignition timing IT, i.e. ignition timing IT at the top dead center of the piston 5. Values that are higher and farther up on the axis in FIG. 2 for the ignition timing IT indicate an advancement of the ignition timing IT (to earlier timing).

The ignition map illustrated in FIG. 2 indicates a first characteristic line 24 for a first operating state i.e. the starting operation, as well as a second characteristic line 25 for a second operating state, i.e., normal operation. The characteristic line 24 for the starting operation ends at an upper starting engine speed $n_{start,\,max}$ at the characteristic line 25 for normal operation. The characteristic line 24 for the starting operation is limited downwardly by a lower starting engine speed $n_{start,min}$. Below this lower starting engine speed $n_{start,min}$ no spark ignition is triggered. For the engine speed range between the lower starting engine speed $n_{start,min}$ and the upper starting engine speed $n_{start,max}$ each engine speed n has two ignition timings correlated therewith, i.e. a first ignition timing on the characteristic line 24 for the starting operation and a second ignition timing on the characteristic line 25 for normal (regular) operation. The ignition timing of the characteristic line 25 is always before the ignition timing of the characteristic line 24 for the starting operation.

The characteristic line 24 for the starting operation is embodied as a branch that ascends with increasing engine speed. In this connection, an approximately continuous ascent of the characteristic line 24 is advantageous. Above the upper starting engine speed $n_{start,max}$ a constant course of the characteristic line 25 for the operating state is provided. When, beginning at the upper starting engine speed $n_{start,max}$ the engine speeds n drop, the characteristic line 25 first ascends toward earlier ignition times. A descending branch 26 of the characteristic line 25 adjoins this ascending section and is approximately parallel to the characteristic line 24 for the starting operation. On the descending branch 26 the ignition timings are retarded as the engine speed drops.

The characteristic line 24 is located in an ignition range 27 for the starting operation which ignition range extends between the lower starting engine speed $n_{start,min}$ and the upper starting engine speed $n_{start,max}$. In a direction toward advanced ignition timings, the ignition range 27 is delimited by an ignition range 28 for normal operation. The ignition range 28 for regular operation defines the range within which the ignition timing should be in the operating state in order to prevent kickback. The ignition range 28 is defined by a band that, with increasing engine speed n, ascends toward earlier ignition timings IT and, with dropping engine speed n, descends toward retarded ignition timings IT. The ignition ranges 27 and 28 indicate the areas of the ignition map in which characteristic lines 24 for the starting operation and characteristic lines 25 for the operating state should be located. In this connection, a suitable characteristic line 24, 25 is to be selected for the two-stroke engine 1 within the respective range 27, 28.

The ignition range 28 for operation is delimited toward the advanced ignition timings by a kickback range 29. The boundary of the kickback range 29 toward advanced ignition timings i.e., in the ignition map of FIG. 2 in the downward direction, corresponds to the shape of the ignition range 28 for the operating state. The kickback range 29 is reached for lower engine speeds n at retarded ignition timings as compared to higher engine speeds n. Above the upper starting engine speed $n_{start,max}$ the kickback range 29 can no longer be reached. As shown in FIG. 2, the descending branch 26 of the characteristic line 25 is spaced at a spacing relative to the kickback range 29 in order to ensure that kickback does not occur. The descending branch 26 determines for each engine speed an earliest ignition timing IT wherein the earliest ignition timing IT according to the descending branch 26 of the characteristic line 25 is pushed for lower engine speeds n to delayed ignition timings IT. Because of this course of the descending branch 26 it is ensured that no kickback occurs.

Figure 3:
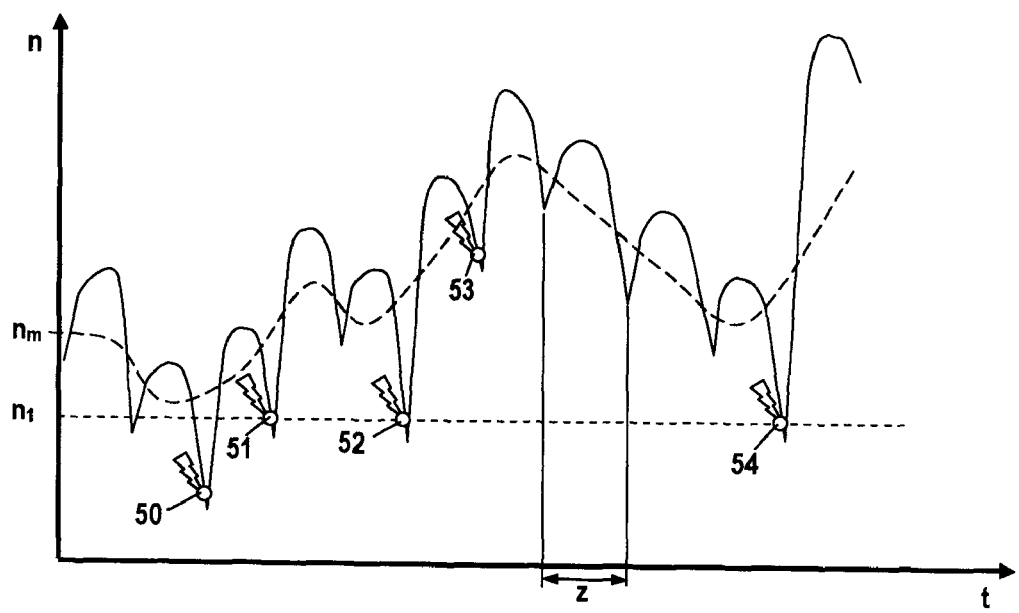
FIG. 3 illustrates an exemplary course of the engine speed over time.

In FIG. 3 an exemplary course of the engine speed n of the two-stroke engine 1 as a function of the time t is illustrated. An engine cycle z extends from a local minimum of the curve to the next local minimum, respectively. The engine cycle z is illustrated between two sequential top dead centers of the piston 5. The engine cycle z can also be measured, for example, between two sequential bottom dead centers of the piston 5, i.e., between two local maxima. As illustrated in the diagram, the engine speed n varies greatly across the course of the engine cycle. Beaming at the top dead center, the piston 5 is first accelerated greatly. In the area of the top dead center a maximum of the engine speed n is reached. Until the next top dead center is reached, the engine speed n drops again.

In the illustration of FIG. 3, after the second illustrated cycle a combustion 50 takes place. The engine speed n increases to a momentary engine speed $n_1$ until the subsequent cycle begins. In the subsequent cycle a combustion 51 takes place. As a consequence the engine speed will increase again greatly. During the subsequent revolution no combustion occurs. Only during the second to next cycle the combustion 52 takes place. The combustion 52 is taking place at the momentary engine speed $n_1$. In the subsequent cycle a combustion 53 takes place but at an engine speed that is higher than the engine speed no. Only upon the fourth subsequent cycle the next combustion 54 takes place.

For the combustions 51 and 53 the combustion chamber 3 of the two-stroke engine 1 has been scavenged less than for the combustion 52 or the combustion 54. The combustions 51 and 53 are therefore less strong than the combustion cycles 52 or 54. The risk of kickback is therefore less than for the combustions 51 and 53 because these combustions occur slower. For the combustion 52 and particularly for the combustion 54 the risk of kickback is increased.

Figure 4:
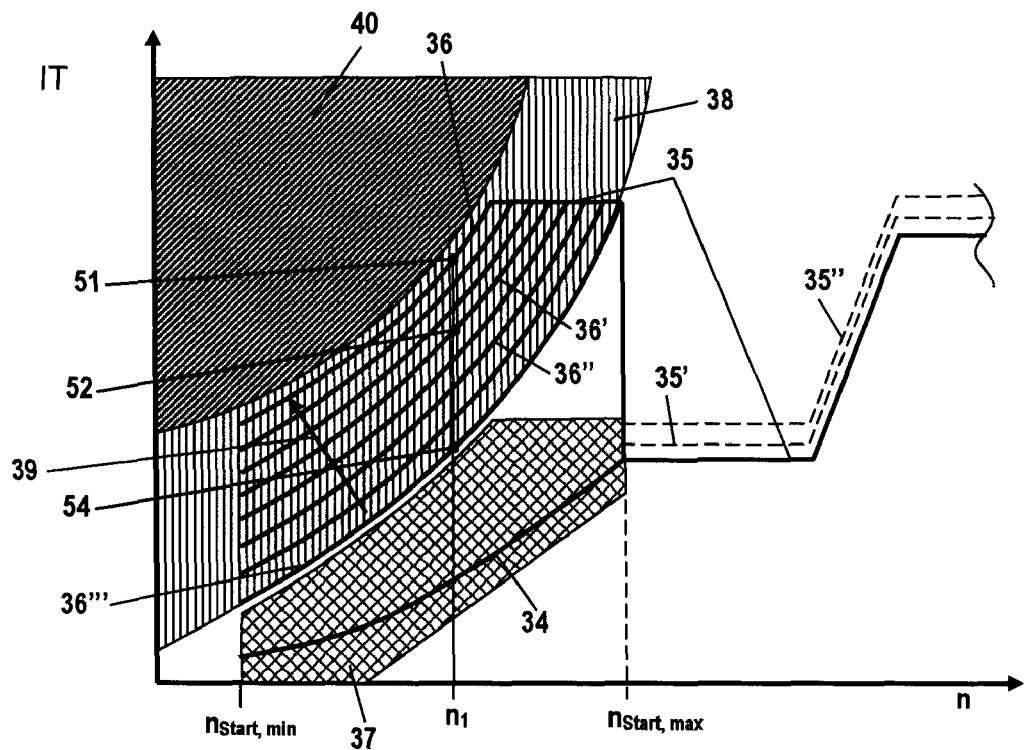
FIG. 4 shows an embodiment of an ignition map that indicates the ignition timing as a function of the engine speed.

The different risks of kickback as a result of different scavenging actions of the combustion chamber 3 can be taken into account by the ignition map illustrated in FIG. 4. The ignition map shows a characteristic line 34 for the starting operation and a characteristic line 35 for normal operation whose course may corresponds approximately to the course of the characteristic lines 24 and 25 of FIG. 2. Between the lower engine speed $n_{start,min}$ and the upper engine speed $n_{start,max}$ the characteristic line 35 as well as the characteristic line 34 indicate an ignition timing IT, respectively. As shown in FIG. 4, the characteristic line 35 has several descending branches 36, 36', 36", 36'" that all have approximately the same course. The branch 36 may correspond to the branch 26 of FIG. 2.

The characteristic line 36'" is located in a lower area of an ignition range 38 for operation adjacent to an initial range 37 for starting the two-stroke engine 1. Characteristic lines 36", 36', and 36 are displaced relative to the characteristic line 36'" in the direction of arrow 39 by different amounts in the direction of the kickback range 40. For determining the ignition timing IT for an engine cycle z, it is provided to select one of the descending branches of the characteristic line 35 for operation as a function of the number of engine cycles without combustion. In FIG. 4 the characteristic lines 36, 36', 36", and 36'" are indicated in exemplary fashion as descending branches of the characteristic line 35.

For the combustion 51 illustrated in FIG. 3 the combustion chamber 3 was scavenged by only one engine cycle. The risk of a kickback is therefore only minimal so that the ignition timing for the combustion 51 can be selected on the descending branch 36. For the combustion 52 the combustion chamber 3 was scavenged by two engine cycles so that in this case the risk of kickback is greater. The ignition timing IT of the combustion 52 is therefore selected on a descending branch 36' that is within a central area of the ignition range 38. For the combustion 54 the combustion chamber 3 was scavenged very well. Therefore, for the combustion 54 the risk of kickback is very high so that the ignition timing for the combustion 54 is selected on the characteristic line 36'" that is at the lower edge of the ignition branch 38.

The ignition timing IT is determined as a function of the engine speed $n_1$ and the selected characteristic line 36, 36', 36". As indicated in FIG. 4 in dashed lines, also above the upper starting engine speed $n_{start,max}$ the determination of the ignition timing can be realized based on a selection of a characteristic line 35, 35', 35" as a function of the number of engine cycles where no combustion has taken place. The position of the ignition ranges 37 and 38 and of the kickback range 40 corresponds to the position of the ignition ranges 27 and 28 and of the kickback range 29 of FIG. 2.

Figure 6:
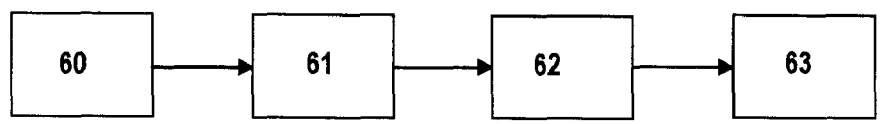
FIG. 6 shows a flowchart for performing the method.

In operation of the two-stroke engine 1 switching is done between the characteristic lines 24, 34 for the starting operation and the characteristic lines 25, 35 for normal operation. The course of the method for operating the two-stroke engine 1 is schematically indicated in FIG. 6. In the method step 60 the two-stroke engine 1 is started. The ignition timing IT is determined based on the first characteristic lines 24, 34 for the starting operation. In the engine is running for normal operation switching to the second characteristic line 25, 35 takes place. Switching can be realized based on one of several switching conditions. Advantageously, switching is done only after completion of a predetermined number of engine cycles. Advantageously, 15 to 30 engine cycles must have been completed before the control unit 22 switches to the characteristic line 25, 35 for normal operation. Alternatively, or additionally, as a further condition it is provided that the engine speed n must have surpassed the switching engine speed $n_{switch}$ illustrated in FIG. 2. The switching engine speed $n_{switch}$ is advantageously below the upper starting engine speed $n_{start,max}$. The switching engine speed $n_{switch}$ is advantageously 2,300 rpm up to 3,500 rpm. Additionally or alternatively as a switching condition it is provided that a predetermined number of combustions has taken place, the combustions ensure that the two-stroke engine 1 operates at idle.

Figure 5:
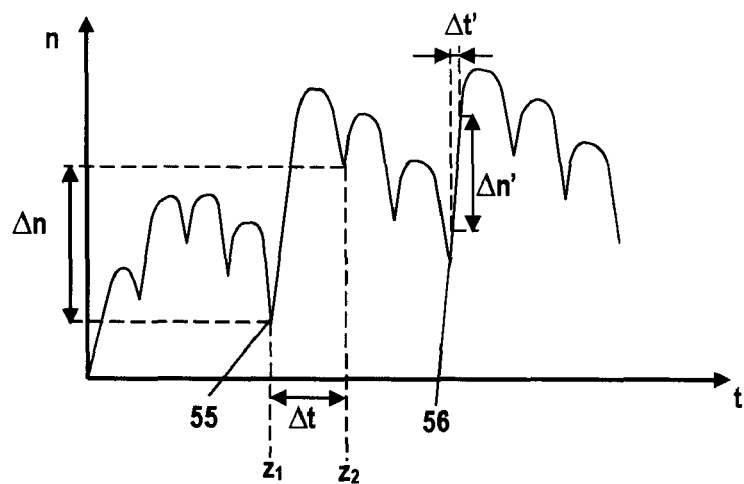
FIG. 5 is a diagram that shows in an exemplary fashion the engine speed over time when starting the motor.

The determination whether a combustion has taken place or not is illustrated schematically in FIG. 5. A typical engine speed course when starting the engine is shown. The first four cycles of the two-stroke engine 1 are reached when the operator actuates the starting device, in particular by pulling a pull cable. Subsequently, combustion 55 at the beginning of engine cycle $z_1$ takes place. Since a combustion 55 has taken place, the engine speed differential Δn between the beginning of the engine cycle $z_1$ and the beginning of the subsequent engine cycle $z_2$ is very large. The engine speed differential Δn can be a measure to determine whether a combustion has taken place or not. Alternatively, as a measure whether combustion has taken place or not, the engine speed differential Δn relative to the corresponding time differential Δt can be utilized. At a later point in time a further combustion 56 takes place. As shown in FIG. 5, an engine speed differential Δn' relative to the time differential Δt' can also be detected across a partial range of an engine cycle, for example, between the top and bottom dead centers of the piston 5 because in this range the engine speed increase is very strong. The engine speed increase relative to time also provides a measure whether combustion has taken place.

When one or several of the switching conditions are present, it is provided that the control unit 22 in the method step 61 switches from the characteristic line 24 or 34 to the characteristic line 25 or 35. In operation, the ignition timing IT is determined based on the characteristic line 25 or the characteristic line 35. When determining the ignition timing based on the characteristic line 35, in the engine speed range between the lower starting engine speed $n_{start,min}$ and the upper starting engine speed $n_{start,max}$ it is provided that additionally the number of preceding engine cycles where no combustion has taken place is determined. The normal operation is characterized by method step 62. In the subsequent method step 63 it is provided that the control unit 22 switches from the second characteristic line 25, 35 back to the first characteristic line 24, 34. This can be done, for example, when the self-sustaining engine speed $n_{self-sust}$ shown in FIG. 2 is undershot. Moreover, it is provided that the control unit 22 switches to the characteristic line 24, 34 for starting when the stop switch 23 is actuated by the operator.

The engine speed n indicated in FIGS. 2 and 4 based on which the ignition timing IT is determined can be the momentary engine speed $n_1$ shown in FIG. 3. i.e., an engine speed at a predetermined point in time of an engine cycle. However, it can also be provided that has an engine speed n an average engine speed $n_m$ is utilized; average engine speed $n_m$ is shown in FIG. 3 in dashed lines. The average engine speed $n_m$ refers to an average engine speed of an engine cycle. In FIG. 3 the course of the average engine speed is shown as a connection of the resulting engine speed values for each engine cycle.

The illustrated method for controlling a two-stroke engine and for determining the ignition timing IT can also be advantageous for other operating states. Setting the earliest ignition timing and determining the ignition timing based on the number of engine cycles without combustion can be utilized in the same engine speed range or in different engine speed ranges.

The proposed method can be utilized also for a two-stroke engine with scavenging action, i.e., a two-stroke engine that is supplied with a fuel/air mixture by means of a mixture passage and scavenging air by means of an air passage. For supply of fuel a carburetor, in particular a diaphragm carburetor, can be provided.

The specification incorporates by reference the entire disclosure of German priority document 10 2007 031 396.0 having a filing date of 5 Jul. 2007.

While specific embodiments of the invention have been shown and described in detail to illustrate the inventive principles, it will be understood that the invention may be embodied otherwise without departing from such principles.

What is claimed is:

1. A method for operating a two-stroke engine that comprises a cylinder with a combustion chamber that is delimited by a reciprocating piston, wherein the piston drives in rotation a crankshaft, and wherein a spark plug projects into the combustion chamber and ignites a fuel/air mixture, wherein the two-stroke engine further comprises devices for supplying fuel and combustion air to the combustion chamber and a control unit that determines the ignition timing based on an ignition map, wherein the ignition map indicates the ignition timing as a function of the engine speed for at least one first and one second operating states and for at least one first and one second engine speed ranges; the method comprising the step of:
    setting for an engine cycle the ignition timing in the second operating state at least within the first engine speed range based on the engine speed and based on the number of engine cycles since the last combustion, wherein, at the same engine speed, different ignition timings are set for at least two different numbers of engine cycles since the last combustion.

2. The method according to claim 1, wherein the ignition timing is set for every engine cycle in the first engine speed range based on an engine speed and based on the number of engine cycles since the last combustion.

3. The method according to claim 1, wherein the ignition map in the first engine speed range has several characteristic lines that indicate the ignition timing as a function of the engine speed, wherein based on the number of engine cycles since the last combustion one of the characteristic lines is selected for setting the ignition timing for a subsequent engine cycle.

4. The method according to claim 1, wherein the ignition timing is determined based on a momentary engine speed.

5. The method according to claim 1, wherein the ignition timing is determined based on average engine speed of an engine cycle.

6. The method according to claim 1, wherein the first operating state is the starting operation, wherein the first engine speed range is limited by a lower starting engine speed and an upper starting engine speed, and wherein the second operating state is normal operation.

7. The method according to claim 1, further comprising the step of switching in the control unit from a first characteristic line for the first operating state to a second characteristic line for the second operating state, when at least one switching condition is fulfilled.

8. The method according to claim 7, wherein the at least one switching condition is the lapse of a predetermined time interval.

9. The method according to claim 7, wherein the at least one switching condition is completion of a predetermined number of engine cycles.

10. The method according to claim 7, wherein the at least one switching condition is reaching a switching engine speed.

11. The method according to claim 10, wherein the switching engine speed is a preset engine speed that is from 2,300 rpm up to 3,500 rpm.

12. The method according to claim 7, wherein the at least one switching condition is that a predetermined number of combustions have taken place.

13. The method according to claim 12, wherein, for determining whether a combustion has taken place, the engine speed differential between two engine cycles is determined.

14. The method according to claim 12, wherein for determining whether a combustion has taken place an engine speed increase relative to a time interval is determined.

15. The method according to claim 1, further comprising the step of switching in the control unit from a characteristic line for the second operating state to a characteristic line for the first operating state when at least one return condition is fulfilled.

16. The method according to claim 15, wherein the at least one return condition is the actuation of a stop switch of the two-stroke engine.

17. The method according to claim 15, wherein the return condition is undershooting a self-sustaining engine speed.

18. A method for operating a two-stroke engine that comprises a cylinder with a combustion chamber that is delimited by a reciprocating piston, wherein the piston drives in rotation a crankshaft, and wherein a spark plug projects into in the combustion chamber and ignites a fuel/air mixture, wherein the two-stroke engine further comprises devices for supplying fuel and combustion air to the combustion chamber and a control unit that determines the ignition timing based on an ignition map, wherein the ignition map indicates the ignition timing as a function of the engine speed for at least one first and one second operating states and for at least one first and one second engine speed ranges; the method comprising the steps of:

providing in the ignition map different ignition timings in the second engine speed range for the first and the second operating states for the same engine speeds, wherein the second engine speed range is limited by an upper engine speed limit;

advancing in the first operating state the ignition timing when the engine speed decreases from the upper engine speed limit of the second engine speed range;

retarding in the second operating state the ignition timing when the engine speed decreases from the upper engine speed limit of the second engine speed range;

setting in the first operating state the ignition timing in the second engine speed range as a function of an engine speed such that the ignition timing is not before an earliest ignition timing for this engine speed, wherein the earliest ignition timing is retarded when the engine speed drops.

19. The method according to claim 18, wherein the first engine speed range overlaps at least partially the second engine speed range.

* * * * *